United States Patent
Levesque

(10) Patent No.: US 10,152,125 B2
(45) Date of Patent: Dec. 11, 2018

(54) HAPTICALLY ENABLED FLEXIBLE DEVICES

(71) Applicant: Immersion Corporation, San Jose, CA (US)

(72) Inventor: Vincent Levesque, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/947,661

(22) Filed: Nov. 20, 2015

(65) Prior Publication Data

US 2017/0147067 A1 May 25, 2017

(51) Int. Cl.
*G06F 3/01* (2006.01)

(52) U.S. Cl.
CPC .... *G06F 3/016* (2013.01); *G06F 2203/04102* (2013.01); *G09G 2380/02* (2013.01)

(58) Field of Classification Search
CPC .......................................... G06F 2203/04102
See application file for complete search history.

(56) References Cited

U.S. PATENT DOCUMENTS

| 8,754,757 B1* | 6/2014 | Ullrich | G06F 3/016 340/407.1 |
|---|---|---|---|
| 2010/0283727 A1 | 11/2010 | Jiang et al. | |
| 2012/0268412 A1 | 10/2012 | Cruz-Hernandez et al. | |
| 2013/0249975 A1* | 9/2013 | Davie | G06F 3/016 345/698 |
| 2014/0320396 A1* | 10/2014 | Modarres | G06F 3/016 345/156 |

FOREIGN PATENT DOCUMENTS

| EP | 2796964 A1 | 10/2014 |
|---|---|---|
| EP | 2796976 A1 | 10/2014 |

* cited by examiner

*Primary Examiner* — Joseph Haley
(74) *Attorney, Agent, or Firm* — Medler Ferro Woodhouse & Mills PLLC

(57) ABSTRACT

A haptic effect enabled flexible device is presented that includes a flexible frame, a processor, a flexible display and an actuator system. The processor is configured to receive a data stream where the data stream contains visual content. The flexible display is connected to the flexible frame and is designed to display the visual content from the data stream. The actuator system is also connected to the flexible frame and receives drive commands from the processor as a result of the processor executing a plurality of haptic instructions. The drive commands direct the actuator system to deform the flexible device. Execution of the plurality of haptic instructions is synchronized with the display of the visual content on the flexible display device.

24 Claims, 7 Drawing Sheets

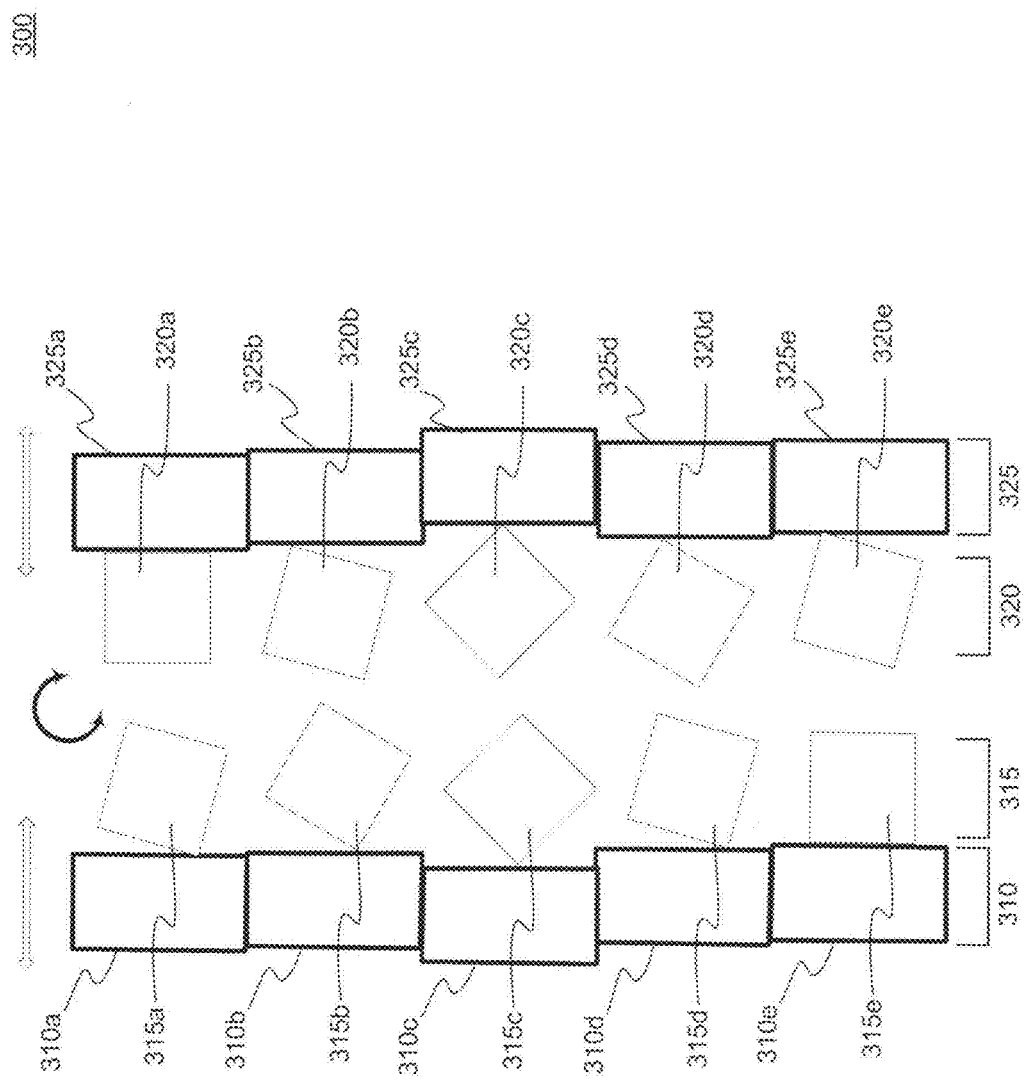

HAPTICALLY ENABLED FLEXIBLE DEVICES

FIELD

One embodiment is directed generally to haptic effects. More particularly, an embodiment is directed to haptic effect in a flexible display device.

BACKGROUND INFORMATION

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect that is perceived by the user.

Typically, haptic effects rely on vibrations to improve the experience of audio-visual media. For example, in a gaming context, when a game includes action such as machine gun fire, explosions or car crashes, the haptic effects include vibrations of varying intensity and duration associated with each event. These vibrations, and other effects, are generated in many devices through the use of some type of actuator or haptic output device. Known actuators used for this purpose include an electromagnetic actuator such as a solenoid actuator, an Eccentric Rotating Mass ("ERM") actuator in which an eccentric mass is moved by a motor, a Linear Resonant Actuator vibration motor ("LRA"), an electroactive polymer actuator, or a piezoelectric actuator. Further, kinesthetic actuators may be used to provide haptic feedback through mechanical movement of a device.

SUMMARY

One embodiment of the present invention is a haptic effect enabled flexible device capable of being deformed. The flexible device includes a flexible frame, a processor that receives a data stream, and a flexible display attached to the flexible frame that is used to display visual content received by the processor from the data stream. The haptic effect to deform the flexible display and frame is accomplished by having an actuator system receive a drive command from the processor that directs an actuator to deform the display and frame into a new shape. The deformation can be along a single axis, along two axes, or along three axes.

Another embodiment of the present invention is a method of deforming a flexible display. The method includes receiving content in a data stream that contains visual content and extracted that visual content. The visual content is then displayed on the flexible display. Haptic effects are generated by a processor that produces a drive command to control an actuator system. The actuator system then deforms the flexible display based on the drive command.

BRIEF DESCRIPTION OF THE DRAWINGS

FIG. 3 illustrates multiple actuators and deformable sections in a single axis, according to an embodiment.

DETAILED DESCRIPTION

Flexible displays are one of the most anticipated features of the next generation of smart phones, and have attracted a lot of attention in industry and academia. Flexible displays can enable a wide array of interactions and can even be rolled or conformed to a particular curved shape. Thus, a flexible display can be combined with a flexible frame and an actuator system to allow haptic effects to be incorporated and integrated into a deformable display device.

An embodiment of a haptic effect enabled flexible device includes a flexible frame, a processor, a flexible display and an actuator system. The processor is configured to receive a data stream where the data stream contains visual content. The flexible display is connected to the flexible frame and is designed to display the visual content from the data stream. The actuator system is also connected to the flexible frame and receives drive commands from the processor. The drive commands direct the actuator system to deform the flexible device.

In another embodiment, the haptic effect enabled flexible device also includes a haptic effects subsystem that stores haptic instructions that, when executed by the processor, cause the processor to generate the drive command. In one embodiment the haptic instructions are authored prior to being sent in the data stream. In another embodiment no haptic instructions are sent in the data stream. Rather, the processor, using computer vision software, analyzes the video content and automatically generates the haptic instructions. In either case the execution of the haptic instructions are synchronized with the display of the visual content on the flexible display device.

In another embodiment, a method of deforming a flexible display is presented. The method starts by receiving a data stream, where the data stream includes visual content. The method continues by extracting the visual content from the data stream and then displaying it on the flexible display. A processor then generates a drive command to control an actuator system. The actuator system then deforms the flexible display in response to the drive command.

In another embodiment, the method further includes executing multiple haptic instructions to generate the drive command. In one embodiment the haptic instructions are authored prior to the receiving of the data stream and in another embodiment the haptic instructions are automatically derived by the processor based on the visual content.

Figure 1:
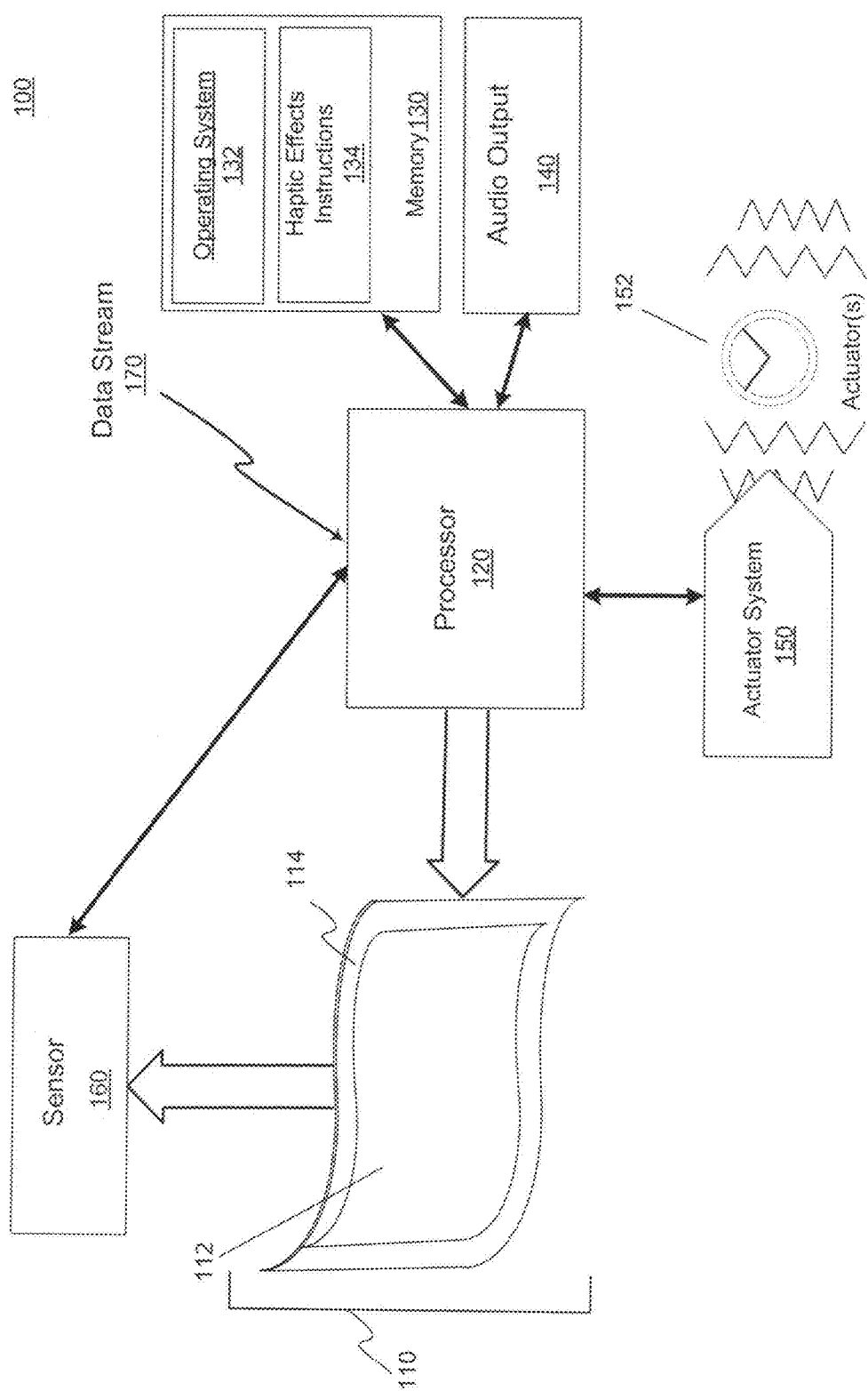
FIG. 1 is a diagram of a haptically-enabled display system in accordance with an embodiment of the present invention.

FIG. 1 is a block diagram of a flexible display system 100 in accordance with an embodiment of the present invention.

System 100 includes a flexible display device 110. Flexible display device 110 contains flexible a display screen 112 and a flexible frame 114. Flexible display device 110 also includes a processor 120, an actuator system 150 including actuator 152, a memory 130 that contains an operating system 132 and haptic effects instructions 134, an audio output 140 and a sensor 160. Further, flexible display system 100 receives content and data via a data stream 170.

Flexible display screen 112 can incorporate a flexible active-matrix organic light-emitting diode ("AMOLED") display technology or electronic paper technology, or any other flexible display technology as is known to one of ordinary skill in the art.

Flexible display screen 112 can also be touch sensitive. Therefore, in addition to displaying images, flexible display screen 112 is capable of recognizing touches, such as those provided by a user, and may also recognize any of the position, pressure magnitude, and duration of touches on the surface. The data corresponding to the touches is sent to processor 120, or another processor within system 100, and processor 120 interprets the touches and in response generates haptic effect signals. The touch surface may sense touches using any sensing technology, including capacitive sensing, resistive sensing, surface acoustic wave sensing, pressure sensing, optical sensing, etc. The touch surface may sense multi-touch contacts and may be capable of distinguishing multiple touches and the location of the touches that occur at the same time.

Flexible display device 110 also includes flexible frame 114 that encloses other components of flexible display device 110, including for example processor 120, memory 130, actuator system 150, and audio output 140. Flexible frame 114 can also include other necessary components that are not shown such as a power source, I/O jacks, microphone, control buttons, camera, etc.

Flexible display device 110 includes processor 120 that is coupled to memory 130, which can store an operating system in addition to haptic effects instructions 134. Haptic effects instructions 134 are also referred to as a "haptic track" and provide a stream of commands to processor 120 that control actuator system 150 to produce the desired haptic effects. Actuator system 150 is coupled to one or more actuators 152. Processor 120 receives content through data stream 170. The content can include data, instructions, video and/or audio content. Data stream 120 can also include a haptic track of haptic effects instructions that are associated with the audio/video content. The haptic effects can include deformation, vibration, or a combination of both. Further, deformation and vibration could be contained in their own "tracks," resulting in a haptic track that includes a vibration track and a deformation track. In some cases the haptic track also includes time markers that correspond with the audio/video content to ensure synchronization between the playback of the content on flexible display screen 112 and audio output 140, and the execution of haptic effects instructions by processor 120.

Processor 120 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Actuators 152 can include one or multiple actuators where such actuators could include deformation and vibration type actuators, or where a deformation actuator could be used to deform and to vibrate. The actuators can include any type of motor, including without limitation an Eccentric Rotating Mass ("ERM"), a Linear Resonant Actuator vibration motor ("LRA"), a piezoelectric motor, or a solenoid actuator. In addition to or in place of actuator 152, system 100 may include other types of haptic output devices (not shown) that may be non-mechanical or vibrotactile haptics devices such as devices that generate electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, devices that provide electrical muscle stimulation, etc. Further, actuators 152 can utilize shape memory alloy ("SMA") wires to force flexible display device 110 to bend along one or more axes, e.g., along the corners or to twist. Other technologies such as smart materials, strings pulled by motors, or arrays of moveable pins could also be used for actuation.

Actuator system 150 and actuators 152 produce haptic effects that include various vibrations and shaking effects. Actuator system 150 and actuators 152 are also used to deform the shape of flexible display device 110. As will be discussed later in more detail, such deformation can occur in a single axis, two axes, or in three axes. Such deformation can produce an extension, twisting or bending of flexible display device 110 in one, two, or three dimensions. Thus, a displayed image on flexible display device 110 can be augmented with vibration, deformation, or both.

Processor 120 may be any type of general purpose processor, or could be a processor specifically designed to provide haptic effects, such as an application-specific integrated circuit ("ASIC"). Processor 120 may be the same processor that operates the entire system 100, or may be a separate processor. Processor 120 fetches haptic effects instructions 134 from memory 130 that direct processor 120 as to which particular haptic effects are to be produced by actuator system 150. Haptic effects instructions 134 can be pre-loaded and resident in memory, or they can be loaded from an integrated port, e.g. Universal Serial Bus ("USB"), or downloaded via data stream 170. Processor 120 can also generate haptic effects instructions 134 based on content received in data stream 170. Data stream 170 could contain the actual haptic effects instructions 134 that would then be stored in memory 130, or data stream 170 would contain audio and/or visual content from which processor 120 would construct haptic effects instructions in real time, or for storage in memory 130 for later playback. System 100, in embodiments that transmit and/or receive data via data stream 170, further include a communication device (not shown), such as a Wi-Fi subsystem or a cellular link.

Memory 130 can be any type of storage device or computer-readable medium, such as random access memory ("RAM") or read-only memory ("ROM") or any other type of computer-readable memory. Memory 130 stores instructions that are executed by processor 120 including operating system 132. The instructions also include haptic effects instructions 134 that are instructions that, when executed by processor 120, generate drive commands for actuator system 150 and actuators 152 that provide haptic effects, as disclosed in more detail below. Memory 130 may also be located internal to processor 120, or any combination of internal and external memory.

Processor 120 outputs the command and control signals to actuator system 150, which includes electronic components and circuitry used to supply actuator 152 with the required electrical current and voltage (e.g., "motor signals") to cause the desired haptic effects. As previously mentioned, system 100 may include more than one actuator 152, and each actuator may include a separate drive circuit (not shown), all coupled to processor 120.

System 100 may include a variety of sensors, such as sensor 160, for sensing interactions with flexible display device 110. Sensor 160 can consist of, among others: strain gauge sensors to measure the deformation magnitude during interactions, force sensing resistor ("FSR") sensors to measure the force/stress applied to the flexible display structures, multi-touch touch sensors to detect the location of single or multiple touch inputs in a touch-enabled display, multi-touch pressure sensors to measure the pressure applied under each touch location, temperature/humidity/atmospheric pressure sensors to capture environmental conditions, an accelerometer/gyroscope/magnetometer to characterize the motion, velocity, acceleration and orientation of the display, a microphone to capture a user's voice command or environmental audio information, and wireless transmitters to receive/transmit information from/to other devices wirelessly. The data corresponding to sensor 160 is sent to processor 120, or another processor within system 100, and processor 120 interprets the sensor data and in response can generate haptic effect signals, feedback through data stream 170, audio responses, and visual images on flexible display screen 112.

In addition to the actuators discussed above, system 100 may include a variety of actuators for providing vibrotactile or kinesthetic feedback including flexible, semi-rigid, or rigid actuators, including Electro Active Polymer ("EAP") actuators, smart fluids actuators, rheological fluidic actuators, Macro-Fiber Composite ("MFC") actuators, Shape Memory Alloy ("SMA") actuators, piezo actuators, and Micro-Electro-Mechanical System ("MEMS") actuators.

System 100 may be a handheld device, such a cellular telephone, personal digital assistant ("PDA"), smartphone, computer tablet, gaming console, vehicle based interface, etc., or may be any other type of flexible device that includes a haptic effect system with one or more actuators. The user interface may be a touch sensitive surface, or can be any other type of user interface such as a microphone, camera, etc. In embodiments with more than one actuator, each actuator that has rotational capability may have a different rotational capability in order to create a wide range of haptic effects on the device, for example each actuator can be controlled individually; also some rotational actuators have their axis of rotation at an angle to the axis of rotation of other rotational actuators. Likewise, in embodiments with multiple actuators with other capabilities, each actuator can be controlled individually to exhibit a wide range of haptic effects on the device. For example, multiple actuators could be used to independently deform each of the four corners of flexible display device 110, each at a different rate and degree of deformation.

Flexible displays in general allow for a wide array of novel interactions by taking advantage of deformation as an additional method to convey information. However, the uniform/continuous feedback resulting from deformation interactions with flexible displays may not provide intuitive metaphors that relate events occurring digitally to physical interactions from a non-digital space. In other words, users do not typically interact in a non-digital space with small flat objects of the size of phones and tablets, as opposed to actual books, magazines and other objects. Embodiments offer a system for compelling user interactions and additional information about the digital environment to the user through haptics communication channels. Embodiments expand the user interface design space, enhance the interaction experience with flexible displays, and render deformation-based gestures more intuitive and natural. Moreover, embodiments provide an effective way to translate and deliver information about the digital world in the form of haptics.

Rather than a single surface display, a flexible display device can simultaneously, in three axes, provide a wide range of user experiences. In an embodiment, the flexible display could bend away from the user as an event is anticipated, and then released or bent outwards when the event occurs. For example, in watching a video of someone attempting to hit a ball with a baseball bat, the flexible display would bend inwards as the baseball bat is moved back and then outwards as it swings against the ball. In another embodiment, a deformation effect could be used to mark a surprising event. For example, a tablet could bend outwards abruptly as the protagonist in a movie abruptly loses a piece of paper to a gust of wind and then bend back slowly to its unbent state so that the transition back to the unbent state is not perceptible.

In an embodiment, the flexible display would bend to accentuate certain events occurring onscreen. For example, an explosion could cause violent movements of the device, whereas a pebble falling in water would cause small ripples of the flexible display. In addition, the bending of the screen could reflect where the viewer should focus their attention. Flexible display device 110 with flexible screen 112 could bend outwards when the object of interest is in the foreground and then inwards when it is in the background.

The deformation of flexible screen 112 could simulate effects that are often produced in three-dimensional movies, such as accentuating an object coming towards the viewer. For example, flexible display device 110 could bend outwards as a ball flies towards the viewer.

Further, the bending of flexible display device 110 could follow changes in zoom or focus of a video being displayed on flexible screen 112. For example, as the camera zooms out the display could slowly bend outwards. This could potentially be used to create responses similar to a vertigo effect. A vertigo effect is created when a camera lens zooms in on a subject, while the camera itself is physically moved away from the subject, or vice versa. This movement effectively changes the focal length of the lens without altering the image composition and where the foreground images appear to change in size relative to each other.

Bending and deformation of flexible display device 110 allows a user to watch an audio/visual segment, e.g., a movie, with a more intense experience. For example, Alice is watching an action movie on her flexible tablet. She feels the tablet retract as a character prepares a punch, and abruptly spring forward as the character launches the punch. She later feels her tablet bend back and forth with force as a car explodes. As a grenade is thrown at the camera, she feels her tablet bulge out towards her. Overall, Alice receives a much more intense experience watching the movie than she would have experienced without the haptic effects.

Figure 2:
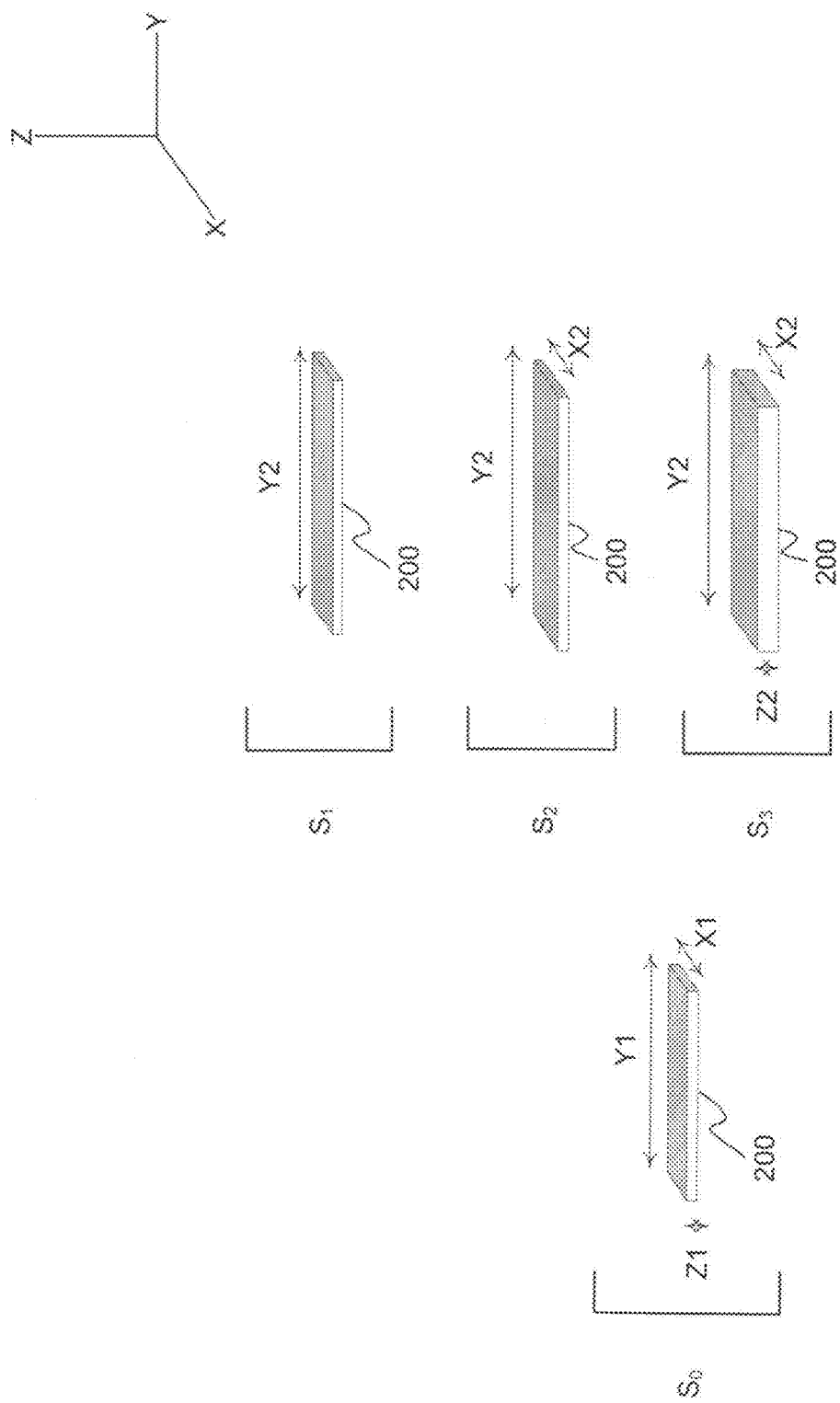
FIG. 2 illustrates various forms of deformation of a flexible display in a single axis, double axes and triple axes according to an embodiment.

FIG. 2 is an illustration of various forms of deformation of a flexible device in accordance with an embodiment of the present invention. Reference to a flexible device in this specification also includes reference to a flexible device that also contains a flexible screen. Here, flexible device 200 is shown in an initial non-deformed state $S_0$ with a length of Y1 on the Y axis, a depth of X1 in the X axis, and a height of Z1 in the Z axis.

Flexible device 200, in executing haptic instructions, that have been pre-loaded in memory within flexible device 200 or received via a data stream as presented in FIG. 1, could be instructed to deform along a single axis. For example, flexible device 200 is shown in state $S_1$ where width Y2 has increased from the initial length Y1. While flexible device is showing a deformation along the Y axis, such deformation could be along any axis. State $S_2$ of flexible device 200 shows deformation along two axes. In this example width Y2 has increased from the initial Y1 width and the depth of flexible device 200 has increased from X1 to X2. In a similar manner, state $S_3$ illustrates a deformation in all three axes where Y2 has increased from the initial Y1, X2 has increased from the initial X1, and now height Z2 has increased from the initial Z1 height. While these deformations are all shown as an "increase," the deformation can also be decreases in size, or a combination of both increases and decreases. FIG. 2 illustrates only a single deformation in any axis, but can be expanded significantly as will be discussed next.

FIG. 3 is an illustration of various forms of deformation using multiple actuators in an axis of a flexible device, in accordance with an embodiment of the present invention. System 300 includes deformable outer shells 310 and 325 that are deformed by actuators 315 and 320. Further, in an embodiment, outer shells 310 and 325 include multiple sections, shown here as 310a-e and 325a-e to allow a flexible display device, driven by a haptic track of instructions, to take on an infinite variety of shapes. Outer shells 310 and 325, along with actuators 315 and 320 can be reproduced along the x-axis, the y-axis, and the z-axis to allow a flexible display device to deform in all three axes.

Figure 4A:
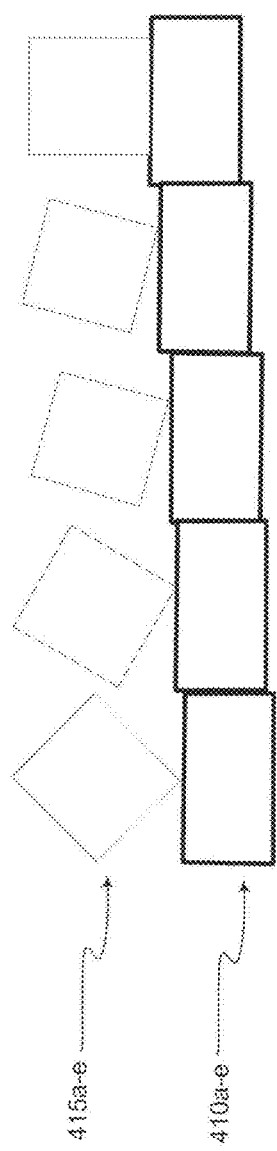
FIGS. 4A, 4B and 4C illustrate the bending of a flexible device, according to an embodiment.

FIG. 4A is an illustration of actuators 415a-e being used to deform a flexible device using a bending action across sections 410a-e. The actuators shown here are by way of example only as multiple other types of actuators could be used to deform a flexible device in a bending manner. Further, although multiple sections are shown in FIG. 4A, depending upon the type of actuator system being used, a flexible device could consist of a single pliable frame or form.

Figure 4B:
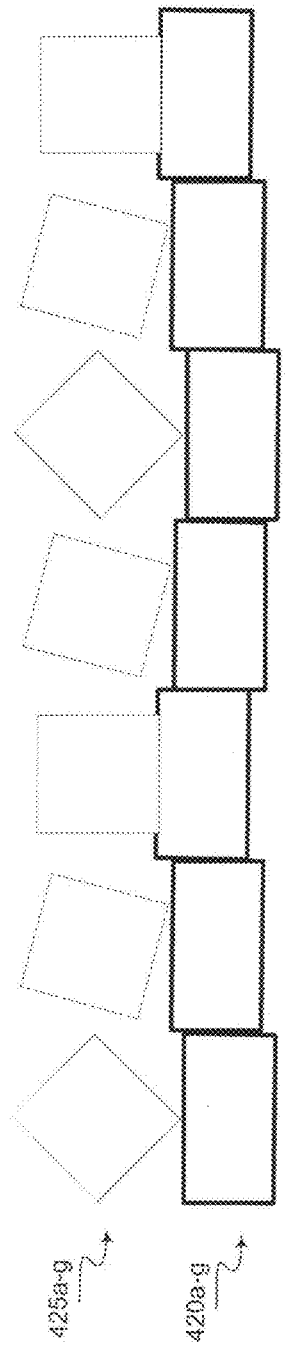
Figure 4C:

FIG. 4B is an illustration of actuators 425a-g deforming sections 420a-g of a flexible device to produce a wave or ripple bending effect, according to an embodiment. FIG. 4B could be a representation of a static shape, or an illustration of a single point in time. For example, if a haptic track is desired to convey a ripple sensation, e.g., a pebble dropped in a lake, FIG. 4B would be a single snapshot as one or more ripples would move from one end of a flexible device to the other end. Such a sensation is further illustrated in FIG. 4C with flexible device 430, according to an embodiment.

Figure 5:
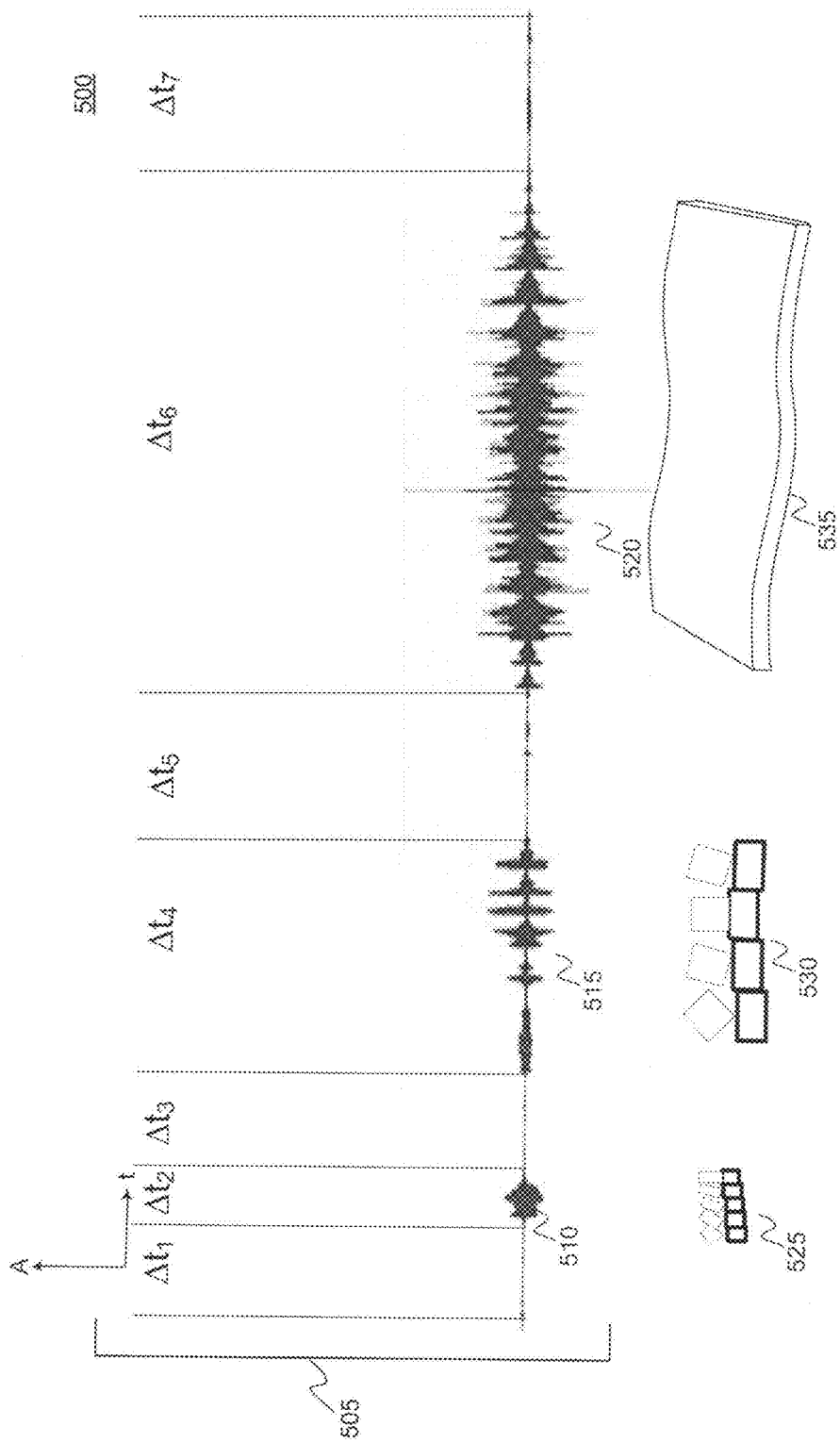
FIG. 5 illustrates an audio input track synchronized with various deformations of a flexible device according to an embodiment.

FIG. 5 illustrates a process 500 of generating a haptic track from an audio input data stream to produce synchronized deformation events on a flexible display device, according to an embodiment. Process 500 includes audio input track 505, which in this example showcases audio events 510, 515 and 520 and is graphed over time on the x-axis and showing amplitude on the y-axis. Events 510, 515 and 520 could be any type of sound or sounds. In this example there is no audio produced during time period $\Delta t_1$, therefore there is no corresponding haptic event produced during this time period. However, in time period $\Delta t_2$, there is a short burst of sound 510. Thus, a short haptic effect 525 would be produced on the flexible device during time period $\Delta t_2$. The haptic effect could be some type of deforming, including bending, of the flexible device. Time period $\Delta t_3$ is another period of no audio input and thus there is again no haptic effect produced. Time period $\Delta t_4$ includes a longer duration audio event 515 and thus the produced corresponding haptic effect 530 will have a longer duration than the effect in time period $\Delta t_2$. The choice of what type of haptic effect and the actual duration is made by a haptic effects designer who then programs the appropriate haptic instructions as introduced in system 100 in FIG. 1.

Process 500 continues with another quiet interval in time period $\Delta t_5$. However, time period $\Delta t_6$ contains audio event 520, the longest audio segment in this example. During this time period haptic effect 535 would be generated in the flexible device. For example, if audio event 520 is a series of rumbles, a corresponding haptic effect could be a series of ripples that would proceed across the flexible device as shown in 535.

Figure 6:
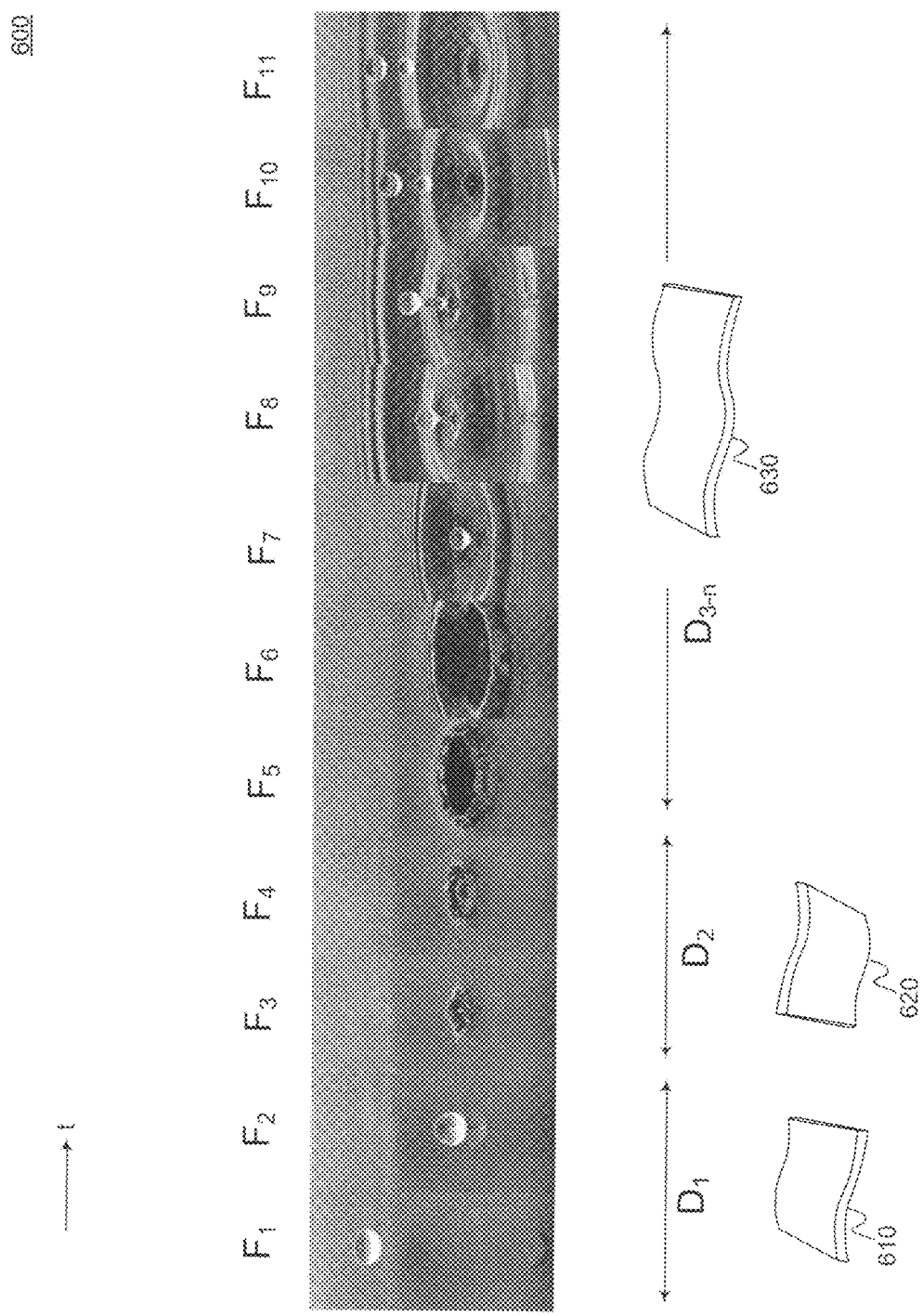
FIG. 6 illustrates a visual input track synchronized with various deformations of a flexible display device according to an embodiment.

Rather than an audio input track, FIG. 6 illustrates a video sequence as the input in process 600, according to an embodiment. Process 600 illustrates 11 frames (F1-F11) depicting a drop of water hitting a smooth body of water, generating a number of ripples, and two small droplets traveling upwards. Process 600 could also include an audio track, such as was illustrated in FIG. 5. As previously discussed, a possible haptic track may include having the flexible display device bend away from the user as an event is anticipated, e.g., frames $F_1$ and $F_2$ as shown by flexible display device in element 610. And, then bent outwards when the event occurs, e.g., when the droplet hits the water in frames $F_3$ and $F_4$ as shown by flexible display device in element 620. The next sequence is a set of ripples in the water in frames $F_5$ through $F_{11}$ which is simulated across the flexible display device as depicted in element 630.

Figure 7:
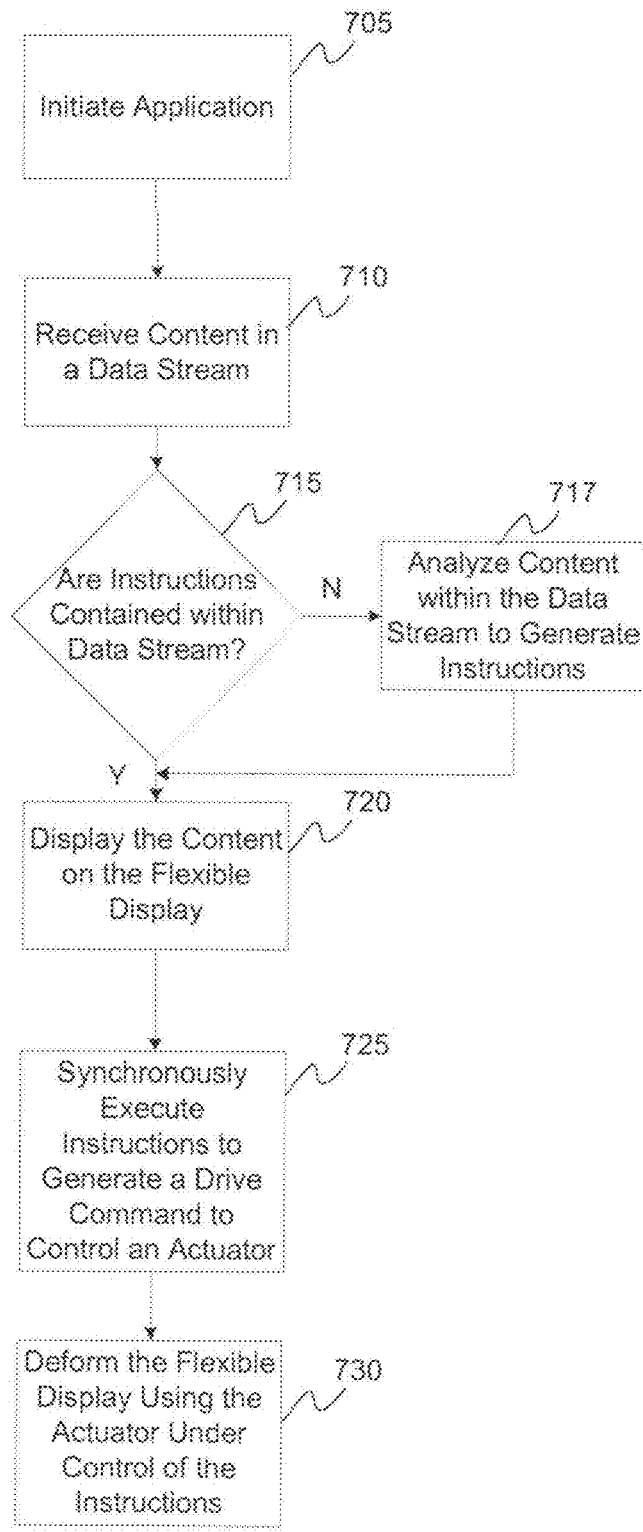
FIG. 7 is a method flow diagram illustrating the receiving of content in a data stream and the execution of haptic instructions that deform the flexible display synchronously with the display of the corresponding visual content according to an embodiment.

FIG. 7 is a flow diagram illustrating method 700 involving the receiving of a data stream, analyzing the data stream, extracting content, and synchronously executing instructions to generate commands to control an actuator to produce haptic effects, according to an embodiment. In some embodiments, the functionality of the flow diagram of FIG. 7 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 705, an application is initiated on a flexible device. The application can be any software program that operates on a flexible device, including a flexible display device 110. The application can be configured to specifically work in an environment that provides haptic feedback on flexible display device 110. At 710, flexible display device 110 receives data stream 170. Data stream 170 would typically include audio content or audio/visual content, and could also include a haptic track that contains haptic effects instructions 134. The content can also include a closed-caption track in support of hearing impaired users. Data stream 170 is also a source to deliver processor operating instructions, operating system upgrades, and other associated software and updates for processor 120.

At 715, processor 120 determines the content of data stream 170. Processor 120 analyzes data stream 170 to determine if data stream 170 contains any video content that is to be displayed and/or audio content that is to be played. Processor 120 also analyzes data stream 170 to determine if there are any corresponding haptic effects instructions 134 pertaining to the received content. These instructions control actuator system 150 that generate a desired haptic effect using actuator(s) 152 that corresponds to the audio, or audio/visual content that is being played by flexible display device 110. For example, haptic effects instructions 134 could direct processor 120 to generate commands to actuator system 150 that cause actuator(s) 152 to vibrate that are associated with the display of an explosion on the screen of flexible display device 110. In another example, haptic effects instructions 134 would instruct processor 120, actuator system 150, and actuators 152 to cause various bending in flexible display device 110 to simulate a ripple effect when viewing a drop of water hitting the smooth surface of a lake.

Haptic effects instructions 134 can be authored by a designer prior to the sending of data stream 170 using a haptic software design tool. The designer makes decisions about the types of desired haptic events to incorporate with the audio and/or audio-visual content that will be sent to the flexible display device. In making these decisions about the types of desired haptic events the designer develops a "script" of haptic effects that is typically referred to as a haptic track. The haptic track can include driving commands for one or more haptic actuators. There are many types of actuators that can be configured into a flexible display device, including vibration actuators, squeezing actuators and deformable system actuators.

The haptic track is sent to flexible display device 110 where it can be stored in processor 120's memory until the corresponding content is selected and played. The haptic track is synchronized with the content so that the haptic effects are generated at the appropriate times. The haptic track may also include time stamp markers to ensure that the haptic effects are generated at the proper times and properly correspond to the displayed content on the flexible display device.

Rather than authoring the haptic track from scratch, it is also possible to utilize certain effects that have been previously produced, such as a D-Box system used in high-end movie theater platforms, as a basis for a haptic track for the flexible display device. For example, a tilt to the right in a D-Box equipped theater seat could be translated to the left-side of a flexible display device bending upwards and the right-side bending downwards.

If processor 120 analyzes data stream 170 and identifies content, but fails to identify any corresponding haptic instructions, then the method is directed to 717, according to an embodiment. At 717 the video content is analyzed using computer vision software on processor 120. A computer vision system can be used to detect changes in focus or zoom, the depth of salient objects in the frame, e.g., moving, and other characteristics that can be mapped to deformations of the flexible display device. This analysis produces a semi-automatic haptic track that can be further verified or edited by a designer. Further, if the identified content includes a closed-caption track, the closed-caption track could be analyzed for trigger verbiage, e.g., explosion, where the generation of haptic instructions would be appropriate.

However, processor 120 can also analyze the content from data stream 170 to automatically generate, and execute, haptic effects instructions. As previously discussed, haptic effects instructions 134 can be selected to bend the flexible display device away when an event is anticipated and then released or bent outwards when the event occurs. These events could be marked by a designer or automatically detected using computer vision or audio analysis. Haptic effects instructions for certain events could also be produced automatically. For example, explosions can be identified by audio or video signature and the corresponding haptic effects instructions chosen for execution at the proper time marks.

A bending of flexible display device 110 can be used to reflect where the viewer should focus their attention. While this action could be identified by a designer, it is possible to make automated approximations based on the camera focus and by analyzing the importance of objects in a scene at a later time in the video. A computer vision system can also identify objects that rapidly change depth, zoom, or focus as an indication of where the viewer should be focusing their attention. Such analysis and construction of a haptic track could be accomplished in real time or near real time by processor 120. Further, to allow for processing time, the system could use a buffer memory to store and analyze the video stream before displaying it on the flexible screen.

Further, depth information contained in three-dimensional movies could similarly be used. The video information gathered at 717 can then be used as a basis to author a haptic track associated with the content sent in data stream 170.

In an embodiment, the haptic track could be authored by a designer by directly manipulating flexible display device 110 equipped with sensors as the audio-video content is playing. For example, to produce an explosion effect the designer would rapidly bend the display back and forth as the video is being viewed.

The method continues to 720 where the visual and/or audio-visual content is displayed on flexible screen device 110, according to an embodiment. If there is only audio content then that content can also be played by the flexible display device. Continuing on to 725, processor 120 would execute the haptic track previously identified to generate drive commands actuator system 150 that control actuators 152 to produce the desired haptic effects. Processor 120 executes the haptic track in sync with the displayed content as previously discussed so that the user of flexible display device 110 will feel the haptic effects at the proper times and in synchronization with the images displayed on the screen of flexible display device 110.

Finally, at 730 as haptic effects instructions 134 in the haptic track are being executed, processor 120 and actuator system 150 generate the appropriate signals to actuators 152 to deform flexible display device 110 as directed by haptic effects instructions 134.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A haptic effect enabled flexible device comprising:
a flexible frame;
a processor located within the flexible frame and configured to receive a data stream, wherein the data stream comprises audio content and visual content;
a flexible display coupled to the flexible frame and configured to display the visual content;
an audio output coupled to the flexible frame and configured to output the audio content;
a haptic effects subsystem configured to store a plurality of haptic instructions; and
an actuator system configured to receive a drive command generated by the processor and configured to cause a deformation of the flexible display and the flexible frame, the deformation including a plurality of bends in the flexible display and the flexible frame,
wherein the processor is further configured
to generate the drive command according to the plurality of haptic instructions, and
to synchronize the deformation of the flexible display and the flexible frame with at least one of the display of the visual content and the output of the audio content.

2. The haptic effect enabled flexible device of claim 1, wherein execution of the plurality of haptic instructions is synchronized with the display of the visual content.

3. The haptic effect enabled flexible device of claim 1, wherein the execution of the plurality of haptic instructions is synchronized with the output of the audio content.

4. The haptic effect enabled flexible device of claim 1, wherein the data stream further comprises the plurality of haptic instructions.

5. The haptic effect enabled flexible device of claim 1, wherein the plurality of haptic instructions are authored prior to a receipt of the data stream.

6. The haptic effect enabled flexible device of claim 1, wherein the plurality of haptic instructions is automatically generated by the processor based on the visual content.

7. The haptic effect enabled flexible device of claim 1, wherein a deformation occurs along three axes.

8. The haptic effect enabled flexible device of claim 1, further comprising a sensor subsystem configured to detect an interaction.

9. The haptic effect enabled flexible device of claim 8, wherein the interaction is a force applied to the flexible display.

10. A method of deforming a flexible device, comprising:
receiving a data stream, wherein the data stream comprises audio content and visual content;
extracting the audio content and the visual content from the data stream;
displaying the visual content on a flexible display coupled to a flexible frame;
outputting the audio content by an audio output unit;
executing, by a processor, a plurality of haptic instructions to generate a drive command to control an actuator system configured to cause a deformation of the flexible display and the flexible frame, the deformation including a plurality of bends in the flexible display and the flexible frame; and
synchronizing the deformation of the flexible display and the flexible frame with at least one of the display of the visual content and the output of the audio content.

11. The method of claim 10, wherein the deformation of the flexible display and the flexible frame is synchronized with the display of the visual content.

12. The method of claim 10, wherein the deformation of the flexible display and the flexible frame is synchronized with the output of the audio content.

13. The method of claim 10, wherein the data stream further comprises the plurality of haptic instructions.

14. The method of claim 10, wherein the plurality of haptic instructions is authored prior to the receiving of the data stream.

15. The method of claim 10, further comprising generating the plurality of haptic instructions automatically by the processor based on the visual content.

16. The method of claim 10, wherein the deformation occurs along three axes.

17. A non-transitory computer-readable medium having instructions stored thereon that, when executed by a processor, cause the processor to implement haptic effects, the implementing comprising:
receiving a data stream, wherein the data stream comprises audio content and visual content;
extracting the audio content and the visual content from the data stream;
displaying the visual content on a flexible display coupled to a flexible frame;
outputting the audio content by an audio output unit;
executing a plurality of haptic instructions to generate a drive command to control an actuator system configured to cause a deformation of the flexible display and the flexible frame the deformation including a plurality of bends in the flexible display and the flexible frame; and
synchronizing the deformation of the flexible display and the flexible frame with at least one of the display of the visual content and the output of the audio content.

18. The non-transitory computer-readable medium of claim 17, wherein the data stream further comprises a plurality of haptic instructions.

19. The non-transitory computer-readable medium of claim 18, the implementing further comprising extracting the plurality of haptic instructions from the data stream and generating, by the processor, the drive command based on the extracted plurality of haptic instructions.

20. The haptic effect enabled flexible device of claim 1, wherein the deformation includes a bending of the flexible display and the flexible frame to draw attention to an object of interest in the visual content.

21. The haptic effect enabled flexible device of claim 1, wherein the deformation includes a first bending of the flexible display and the flexible frame in a first direction as a visual content event is anticipated and a second bending of the flexible display and the flexible frame in a second direction opposite the first direction as the visual content event occurs.

22. The haptic effect enabled flexible device of claim 1, wherein the deformation includes a bending of the flexible display and the flexible frame to simulate a three dimensional effect occurring in the visual content.

23. The haptic effect enabled flexible device of claim 1, wherein the deformation includes a bending of the flexible display and the flexible frame to accentuate events occurring in the visual content.

24. The haptic effect enabled flexible device of claim 1, wherein the deformation includes a bending of the flexible display and the flexible frame to accentuate a surprising event in the visual content.

* * * * *